US011361265B2

(12) United States Patent
Raveendran et al.

(10) Patent No.: US 11,361,265 B2
(45) Date of Patent: Jun. 14, 2022

(54) DATA CENTER IMPACT ASSESSMENT POST DISASTER

(71) Applicant: Kyndryl, Inc., New York, NY (US)

(72) Inventors: Pramod Vadayadiyil Raveendran, Bengaluru (IN); Kuntal Dey, New Delhi (IN); Seema Nagar, Bengaluru (IN); Sougata Mukherjea, New Delhi (IN); Saiprasad Kolluri Venkata Sesha, Bengaluru (IN)

(73) Assignee: Kyndryl, Inc., New York, NY (US)

( * ) Notice: Subject to any disclaimer, the term of this patent is extended or adjusted under 35 U.S.C. 154(b) by 525 days.

(21) Appl. No.: 16/546,447

(22) Filed: Aug. 21, 2019

(65) Prior Publication Data
US 2021/0056485 A1 Feb. 25, 2021

(51) Int. Cl.
*G06Q 10/00* (2012.01)
*G06Q 10/06* (2012.01)
(Continued)

(52) U.S. Cl.
CPC ... *G06Q 10/06315* (2013.01); *G06F 11/0709* (2013.01); *G06F 11/079* (2013.01);
(Continued)

(58) Field of Classification Search
CPC .......... G06Q 10/063; G06Q 10/0631; G06Q 10/06315; G06Q 30/0278
See application file for complete search history.

(56) References Cited

U.S. PATENT DOCUMENTS 9,639,411 B2 5/2017 Teli et al.
10,137,984 B1 * 11/2018 Flick ................ G08G 5/0056
(Continued)

FOREIGN PATENT DOCUMENTS

WO WO-2018136764 A1 * 7/2018 ....... G06F 17/30241

OTHER PUBLICATIONS

Al-Shammari et al., "Disaster Recovery and Business Continuity for Database Services in Multi-Cloud," 1st International Conference on Computer Applications & Information Security (ICCAIS), Riyadh, Saudi Arabia, Apr. 2018, 3 pages.
(Continued)

*Primary Examiner* — William S Brockington, III
(74) *Attorney, Agent, or Firm* — Yee & Associates, P.C.

(57) ABSTRACT

Assessing data center impact post disaster is provided. A data center is divided into hazard segments post disaster based on a combination of hazard type, hazard level, and hazard location identified in time series information from sensors and cameras. A financial value of each identifiable asset in the data center is calculated based on determined operational viability status, estimated soft value, and determined criticality of each identifiable asset. A time cost and an operational cost of impact assessment devices used to assess an impact on the data center and recover assets is calculated. A disaster assessed map is generated by overlaying the time series information, calculated financial values, and calculated time and operational costs on a digital floorplan of the data center. One or more types of impact assessment devices are assigned to each hazard segment at different time periods to rescue and recover financially valuable and operationally viable assets.

18 Claims, 8 Drawing Sheets

(51) Int. Cl.
    *G06F 11/07*         (2006.01)
    *G06Q 30/02*       (2012.01)

(52) U.S. Cl.
    CPC ...... *G06F 11/0751* (2013.01); *G06F 11/0787* (2013.01); *G06Q 30/0278* (2013.01)

(56) References Cited

U.S. PATENT DOCUMENTS

| | | | |
|---|---|---|---|
| 2003/0234725 A1* | 12/2003 | Lemelson | G08B 7/066 340/521 |
| 2010/0066559 A1* | 3/2010 | Judelson | G08B 25/14 358/448 |
| 2016/0216711 A1* | 7/2016 | Srivastava | G08G 5/0013 |
| 2017/0131727 A1* | 5/2017 | Kurdi | G05D 1/0027 |
| 2018/0356241 A1* | 12/2018 | Correnti | G01C 21/3647 |
| 2020/0167992 A1* | 5/2020 | Tran | G06F 16/29 |

OTHER PUBLICATIONS

Kumar et al., "Resource Scheduling for Postdisaster Management in IoT Environment," Hindawi, Wireless Communications and Mobile Computing, vol. 2019, Article ID 7802843, 19 page. https://doi.org/10.1155/2019/7802843.

Pti, "Scientists develop soft, worm-like robots that could assist earthquake rescue operations," The Financial Express, published Apr. 19, 2018, accessed Aug. 21, 2019, 9 pages. https://www.financialexpress.com/lifestyle/science/scientists-develop-soft-worm-like-robots-that-could-assist-earthquake-rescue-operations/1138286/.

D'Monte, "Five robots that may rescue you from natural disasters," LiveMint, updated Jun. 1, 2015, accessed Aug. 21, 2019, 7 pages. https://www.livemint.com/Industry/Bfc02vJKzn7FcdwmXKtrlK/Five-robots-that-may-rescue-you-from-natural-disasters.html.

\* cited by examiner

FROM FIG. 5B

FIG. 5C

528 — GENERATE, BY THE COMPUTER, AN IMPACT ASSESSMENT DATABASE THAT CONTAINS A LIST OF IDENTIFIABLE ASSETS, CURRENT LOCATIONS OF EACH IDENTIFIABLE ASSET, THE FINANCIAL VALUE OF EACH IDENTIFIABLE ASSET, THE DETERMINED OPERATIONAL VIABILITY STATUS OF EACH IDENTIFIABLE ASSET, THE DETERMINED SAFE PATH TO EACH IDENTIFIABLE ASSET, TYPE OF IMPACT ASSESSMENT DEVICE ABLE TO REACH THE CURRENT LOCATION OF EACH IDENTIFIABLE ASSET, ESTIMATED TIME OF RECOVERY OF EACH IDENTIFIABLE ASSET, ESTIMATED COST OF RECOVERY OF EACH IDENTIFIABLE ASSET, AND ESTIMATED SIZE AND WEIGHT OF EACH IDENTIFIABLE ASSET

530 — GENERATE, BY THE COMPUTER, A DISASTER ASSESSED MAP THAT IS A VISUAL REPRESENTATION OF THE IMPACT OF THE DISASTER ON THE DATA CENTER BY OVERLAYING THE INFORMATION CONTAINED IN THE IMPACT ASSESSMENT DATABASE ON THE DIGITAL FLOORPLAN OF THE DATA CANTER DIVIDED INTO THE SET OF ONE OF MORE HAZARD SEGMENTS

532 — GENERATE, BY THE COMPUTER, AN OPTIMAL ASSET RECOVERY PLAN TO RESCUE AND RECOVER IDENTIFIED CRITICAL, FINANCIALLY VIABLE, AND OPERATIONALLY VIABLE ASSETS FROM THE DATA CENTER BASED ON OVERLAID DATA OF THE DISASTER ASSESSED MAP ON THE DIGITAL FLOORPLAN OF THE DATA CENTER THAT IS DIVIDED INTO THE SET OF ONE OR MORE HAZARD SEGMENTS

534 — TRANSMIT, BY THE COMPUTER, THE DISASTER ASSESSED MAP AND THE OPTIMAL ASSET RECOVERY PLAN TO A CLIENT DEVICE FOR USER REVIEW

536 — ASSIGN, BY THE COMPUTER, ONE OF MORE TYPES OF IMPACT ASSESSMENT DEVICES TO EACH HAZARD SEGMENT AT DIFFERENT TIME PERIODS TO RESCUE AND RECOVER AT AN EARLIEST POSSIBLE TIME THE IDENTIFIED CRITICAL, FINANCIALLY VIABLE, AND OPERATIONALLY VIABLE ASSETS GIVEN ENTERPRISE-DEFINED CONSTRAINTS ON RECOVERY COST, RECOVER TIME, AND RECOVERED ASSET VALUE

538 — UTILIZE, BY THE COMPUTER, THE ONE OR MORE TYPES OF IMPACT ASSESSMENT DEVICES ASSIGNED TO EACH HAZARD SEGMENT AT DIFFERENT TIME PERIODS TO PHYSICALLY RESCUE AND RECOVER THE IDENTIFIED CRITICAL, FINANCIALLY VALUABLE, AND OPERATIONALLY VIABLE ASSETS FROM THE DATA CENTER AT THE EARLIEST POSSIBLE TIME

END

DATA CENTER IMPACT ASSESSMENT POST DISASTER

BACKGROUND

1. Field

The disclosure relates generally to data centers and more specifically to assessing an impact of a disaster on a data center to physically rescue and recover critical, financially valuable, and operationally viable assets from the data center at an earliest possible time.

2. Description of the Related Art

A data center is a building, a dedicated space within a building, or a group of buildings used to house computer systems and their associated components, such as, for example, telecommunications systems, storage systems, and the like. Because Information Technology (IT) operations are crucial for business continuity, IT generally includes redundant or backup components and infrastructure for power supply, data communications connections, environmental controls (e.g., air conditioning, fire suppression, and the like), and various security devices. A large data center may be an industrial-scale operation using as much electricity as a small town.

Disaster recovery involves a set of policies, tools, and procedures to enable recovery or continuation of vital IT and computer systems following a natural or human-induced disaster. Disaster recovery focuses on the IT and computer systems supporting critical business functions, as opposed to business continuity, which involves keeping all essential aspects of a business functioning despite significant disruptive events. Thus, disaster recovery may be considered a subset of business continuity.

SUMMARY

According to one illustrative embodiment, a computer-implemented method for assessing data center impact post disaster is provided. A computer divides a data center into hazard segments post disaster based on a combination of hazard type, hazard level, and hazard location identified in time series information from Internet of Things sensors and cameras. The hazard type is based on a type of impact a disaster had on each hazard segment. The hazard level is a degree to which the disaster impacted each hazard segment. The hazard location is with respect to entry and exist points of the data center. The computer calculates a financial value of each identifiable asset in the data center post disaster based on determined operational viability status of each identifiable asset, estimated soft value of each identifiable asset, and determined criticality of each identifiable asset. The computer calculates a time cost and an operational cost of impact assessment devices used to assess an impact on the data center post disaster and recover assets. The computer generates a disaster assessed map that is a visual representation of the impact of the disaster on the data center by overlaying the time series information, calculated financial values, and calculated time and operational costs on a digital floorplan of the data center divided into the hazard segments. The computer assigns one or more types of impact assessment devices to each hazard segment at different time periods to rescue and recover financially valuable and operationally viable assets given constraints on cost, time, and asset value. According to other illustrative embodiments, a computer system and computer program product for assessing data center impact post disaster are provided.

BRIEF DESCRIPTION OF THE DRAWINGS

FIGS. 5A-5C are a flowchart illustrating a process for assessing data center impact post disaster in accordance with an illustrative embodiment.

DETAILED DESCRIPTION

Figure 1:
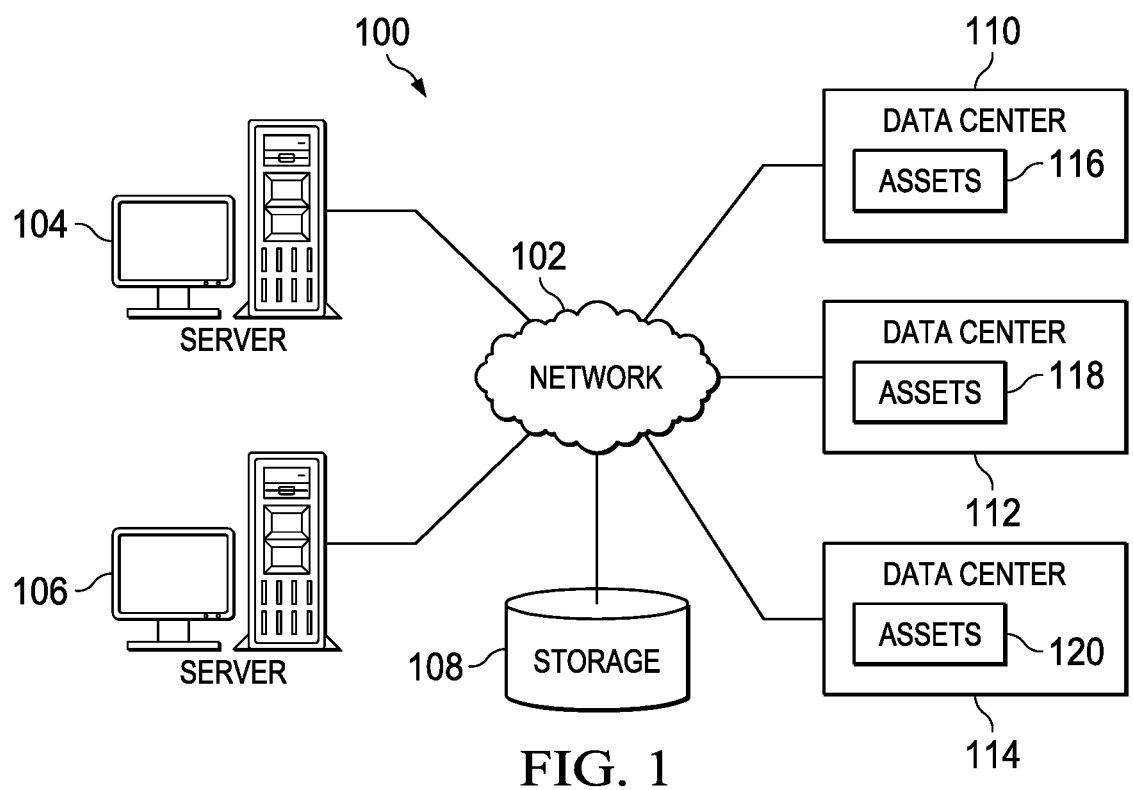
FIG. 1 is a pictorial representation of a network of data processing systems in which illustrative embodiments may be implemented.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

With reference now to the figures, and in particular, with reference to FIGS. 1-4, diagrams of data processing environments are provided in which illustrative embodiments may be implemented. It should be appreciated that FIGS. 1-4 are only meant as examples and are not intended to assert or imply any limitation with regard to the environments in which different embodiments may be implemented. Many modifications to the depicted environments may be made.

FIG. 1 depicts a pictorial representation of a network of data processing systems in which illustrative embodiments may be implemented. Network data processing system 100 is a network of computers, data processing systems, and other devices in which the illustrative embodiments may be implemented. Network data processing system 100 contains network 102, which is the medium used to provide communications links between the computers, data processing systems, and other devices connected together within network data processing system 100. Network 102 may include connections, such as, for example, wire communication links, wireless communication links, fiber optic cables, and the like.

In the depicted example, server 104 and server 106 connect to network 102, along with storage 108. Server 104 and server 106 may be, for example, server computers with high-speed connections to network 102. In addition, server 104 and server 106 provide impact assessment services to client data centers, such as data center 110, data center 112, and data center 114, post disaster. The disaster may be, for example, a natural disaster, such as a hurricane, tornado, tsunami, monsoon, flood, earthquake, avalanche, rock slide, volcanic eruption, or the like, or a human-induced disaster. Also, it should be noted that server 104 and server 106 may each represent a plurality of remote computing nodes in one or more cloud environments that provide disaster impact assessment services. Alternatively, server 104 and server 106 may each represent a set of one or more local servers located in data centers.

Data center 110, data center 112, and data center 114 also connect to network 102. Data center 110, data center 112, and data center 114 are clients of server 104 and/or server 106. Data center 110, data center 112, and data center 114 may be owned and operated by one or more enterprises for transacting business of the enterprises. In addition, data center 110, data center 112, and data center 114 contain assets 116, assets 118, and assets 120, respectively. Assets 116, assets 118, and assets 120 may include, for example, server computers, server racks, power distribution units, electrical cables, consoles, laptop computers, storage devices, and any other equipment necessary to operate data centers 112-116.

Storage 108 is a network storage device capable of storing any type of data in a structured format or an unstructured format. In addition, storage 108 may represent a plurality of network storage devices. Further, storage 108 may store identifiers and information corresponding to a plurality of different data centers, digital floorplans of the different data centers, lists of assets in the different data centers, asset locations in the different data centers, asset types in the different data centers, asset specifications, corporate knowledge bases, and the like. Furthermore, storage 108 may store other types of data, such as authentication or credential data that may include user names, passwords, and biometric data associated with system administrators, for example.

In addition, it should be noted that network data processing system 100 may include any number of additional servers, data center clients, storage devices, and other devices not shown. Program code located in network data processing system 100 may be stored on a computer readable storage medium and downloaded to a computer or other data processing device for use. For example, program code may be stored on a computer readable storage medium on server 104 and downloaded to a data processing system of data center 110 over network 102 for use on the data processing system.

In the depicted example, network data processing system 100 may be implemented as a number of different types of communication networks, such as, for example, an internet, an intranet, a local area network (LAN), a wide area network (WAN), a telecommunications network, or any combination thereof. FIG. 1 is intended as an example only, and not as an architectural limitation for the different illustrative embodiments.

Figure 2:
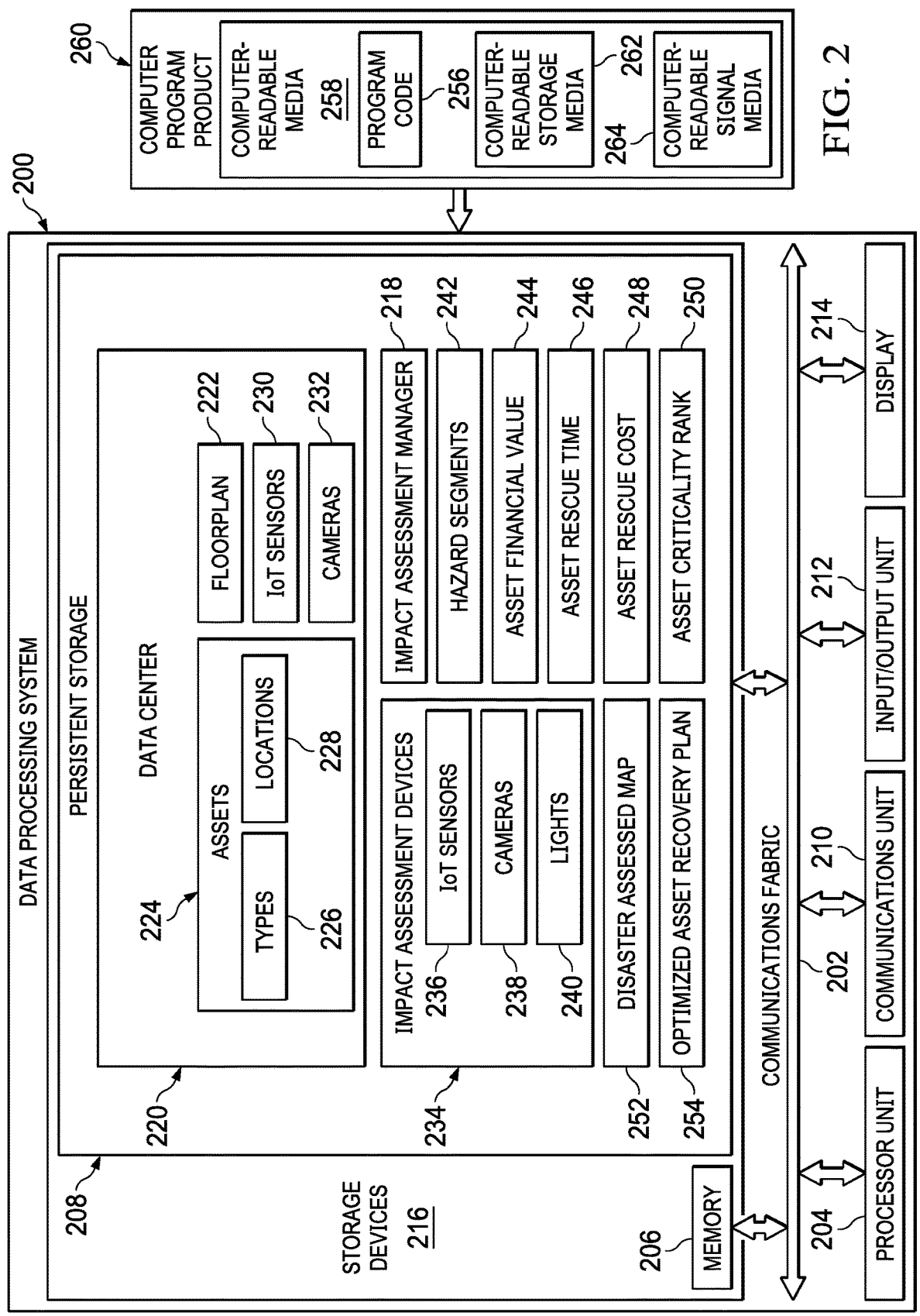
FIG. 2 is a diagram of a data processing system in which illustrative embodiments may be implemented.

With reference now to FIG. 2, a diagram of a data processing system is depicted in accordance with an illustrative embodiment. Data processing system 200 is an example of a computer, such as server 104 in FIG. 1, in which computer readable program code or instructions implementing processes of illustrative embodiments may be located. In this illustrative example, data processing system 200 includes communications fabric 202, which provides communications between processor unit 204, memory 206, persistent storage 208, communications unit 210, input/output (I/O) unit 212, and display 214.

Processor unit 204 serves to execute instructions for software applications and programs that may be loaded into memory 206. Processor unit 204 may be a set of one or more hardware processor devices or may be a multi-core processor, depending on the particular implementation.

Memory 206 and persistent storage 208 are examples of storage devices 216. A computer readable storage device is any piece of hardware that is capable of storing information, such as, for example, without limitation, data, computer readable program code in functional form, and/or other suitable information either on a transient basis and/or a persistent basis. Further, a computer readable storage device excludes a propagation medium. Memory 206, in these examples, may be, for example, a random-access memory (RAM), or any other suitable volatile or non-volatile storage device. Persistent storage 208 may take various forms, depending on the particular implementation. For example, persistent storage 208 may contain one or more devices. For example, persistent storage 208 may be a hard disk drive, a solid-state drive, a flash memory, a rewritable optical disk, a rewritable magnetic tape, or some combination of the above. The media used by persistent storage 208 may be removable. For example, a removable hard drive may be used for persistent storage 208.

In this example, persistent storage 208 stores impact assessment manager 218. However, it should be noted that even though impact assessment manager 218 is illustrated as residing in persistent storage 208, in an alternative illustrative embodiment impact assessment manager 218 may be a separate component of data processing system 200. For example, impact assessment manager 218 may be a hardware component coupled to communication fabric 202 or a combination of hardware and software components. In another alternative illustrative embodiment, a first set of components of impact assessment manager 218 may be located in data processing system 200 and a second set of components of impact assessment manager 218 may be located in a second data processing system, such as, for example, server 106 in FIG. 1.

Impact assessment manager 218 controls the process of assessing an impact of a disaster on a data center to, at an earliest possible time, physically rescue and recover identifiable critical, financially valuable, and operationally viable assets from the data center given enterprise-defined constraints on cost, time, and asset value. Data center 220 represents an identifier of a data center, such as, for example, data center 110 in FIG. 1, which has been impacted by a natural or human-induced disaster. Floorplan 222 represents a digital floorplan or map of data center 220, which has been impacted by the disaster. Assets 224 represent a list of all asset inventory contained in data center 220 prior to the disaster. Types 226 represent a listing of the different makes, models, categories, and kinds of assets 224. Locations 228 represent a location or position of each asset of assets 224 within data center 220 prior to the disaster. It should be noted that locations 228 are expected asset locations and may not be the current asset location post disaster. Also, it should be noted that impact assessment manager 218 may retrieve floorplan 222, assets 224, types 226, and locations 228 from storage, such as, for example, storage 108 in FIG. 1, or a corporate knowledge base corresponding to the enterprise that owns data center 220.

Internet of Things (IoT) sensors 230 represent identifiers for a plurality of sensors, such as, for example, temperature sensors, smoke sensors, fire sensors, water sensors, vibration sensors, electrical hazard sensors, and the like, located within data center 220 that are capable of detecting environment conditions and parameters within data center 220. Cameras 232 represent identifiers for a plurality of imaging devices located within data center 220 that are capable of capturing pictures and videos within data center 220. Impact assessment manager 218 receives and analyzes live time series feeds from operable IoT sensors 230 and cameras 232 post disaster to assess the impact on data center 220.

Impact assessment devices 234 represent a plurality of different impact assessment devices, such as, for example, drones, soft robots, automated vehicles or rolling carts, and the like, that are available to enter and assess the impact of the disaster on data center 220. The drones may be, for example, aerial drones, water drones, land drones, and the like. The soft robots may be, for example, soft-legged robots, which are constructed of highly compliant material, having terrestrial locomotion abilities. The automated vehicles or rolling carts may be, for example, autonomous or semi-autonomous vehicles or rolling carts. Each of impact assessment devices 234 are implemented with IoT sensors 236, cameras 238, and lights 240. IoT sensors 236 and cameras 238 are same or similar to IoT sensors 230 and cameras 232. Impact assessment devices 234 utilizes IoT sensors 236, cameras 238, and lights 240 to capture live time series data of data center 220 post disaster.

Impact assessment manager 218 deploys impact assessment devices 234 to enter data center 220 post disaster when time series feeds from IoT sensors 230 and cameras 232 are not available (i.e., all of IoT sensors 230 and cameras 232 are inoperable due to the disaster). Alternatively, impact assessment manager 218 deploys impact assessment devices 234 to locations or areas within data center 220 where time series feeds from IoT sensors 230 and cameras 232 are not available (i.e., some of IoT sensors 230 and cameras 232 are inoperable due to the disaster, while others are still operable within data center 220 and sending time series feeds). Impact assessment manager 218 receives and analyzes the live time series data from IoT sensors 236 and cameras 238 to assess the impact of the disaster on data center 220.

Impact assessment manager 218 divides data center 220 into hazard segments 242. Hazard segments 242 represent one or more hazard segments within data center 220 that are based on a combination of hazard type, hazard level, and hazard location with respect to entry and exit points of data center 220. Impact assessment manager 218 identifies the hazard types, hazard levels, and hazard locations within data center 220 using the live time series feeds from IoT sensors 230 and cameras 232 located in data center 220 and/or the live time series data from IoT sensors 236 and cameras 238 located on impact assessment devices 234. Impact assessment manager 218 overlays hazard segments 242 on floorplan 222 corresponding to data center 220.

Impact assessment manager 218 calculates asset financial value 244 for each identifiable asset of assets 224 post disaster. In other words, some assets may not be identifiable post disaster. Impact assessment manager 218 calculates asset financial value 244 for each identifiable asset of assets 224 based on determined operational viability status of each identifiable asset, estimated soft value of each identifiable asset (e.g., physical value of the asset to the enterprise, value of intellectual property stored on the asset, and the like), and determined criticality of each identifiable asset.

Asset rescue time 246 represents an amount of time to rescue and recovery each identifiable asset from data center 220. Asset rescue cost 248 represents an amount of money that it will cost to rescue and recovery each identifiable asset from data center 220 (e.g., cost of operating impact assessment devices 234 to assess the impact of the disaster and rescue and retrieve identifiable assets from data center 220).

Impact assessment manager 218 calculates asset criticality rank 250 for each identifiable asset based on, for example, asset financial value 244, asset rescue time 246, asset rescue cost 248, and asset operational viability score corresponding to each respective identifiable asset. Impact assessment manager 218 may also utilize information contained in a corporate knowledgebase to calculate asset criticality rank 250 for each identifiable asset.

Further, impact assessment manager 218 generates disaster assessed map 252, which is a visual representation of the impact of the disaster on data center 220, by overlaying information, such as, for example, locations of identifiable assets, calculated financial value of each identifiable asset, determined operational viability status of each identifiable asset, determined safe path to each identifiable asset, type of impact assessment device capable of reaching the location of each identifiable asset, estimated time for recovering each identifiable asset, estimated cost of recovering each identifiable asset, calculated criticality of each identifiable asset, estimated size and weight of each identifiable asset, and the like, on the floorplan of the data center divided into hazard segments. Furthermore, impact assessment manager 218 generates optimized asset recovery plan 254 based on the information contained in disaster assessed map 252. Optimized asset recovery plan 254 is a plan to physically rescue and recover critical, financially valuable, and operationally viable assets from data center 220 at the earliest possible time given enterprise-defined constraints on cost, time, and asset value. The impact assessment manager 218 may retrieve the enterprise-defined constraints from the corporate knowledgebase, for example.

Communications unit 210, in this example, provides for communication with other computers, data processing systems, and devices via a network, such as network 102 in FIG. 1. Communications unit 210 may provide communications through the use of both physical and wireless communications links. The physical communications link may utilize, for example, a wire, cable, universal serial bus, or any other physical technology to establish a physical communications link for data processing system 200. The wireless communications link may utilize, for example, shortwave, high frequency, ultra high frequency, microwave, wireless fidelity (Wi-Fi), Bluetooth® technology, global system for mobile communications (GSM), code division multiple access (CDMA), second-generation (2G), third-generation (3G), fourth-generation (4G), 4G Long Term Evolution (LTE), LTE Advanced, fifth-generation (5G), or any other wireless communication technology or standard to establish a wireless communications link for data processing system 200.

Input/output unit 212 allows for the input and output of data with other devices that may be connected to data processing system 200. For example, input/output unit 212 may provide a connection for user input through a keypad, a keyboard, a mouse, a microphone, and/or some other suitable input device. Display 214 provides a mechanism to display information to a user and may include touch screen capabilities to allow the user to make on-screen selections through user interfaces or input data, for example.

Instructions for the operating system, applications, and/or programs may be located in storage devices 216, which are in communication with processor unit 204 through communications fabric 202. In this illustrative example, the instructions are in a functional form on persistent storage 208. These instructions may be loaded into memory 206 for running by processor unit 204. The processes of the different embodiments may be performed by processor unit 204 using computer-implemented instructions, which may be located in a memory, such as memory 206. These program instructions are referred to as program code, computer usable program code, or computer readable program code that may be read and run by a processor in processor unit 204. The program instructions, in the different embodiments, may be embodied on different physical computer readable storage devices, such as memory 206 or persistent storage 208.

Program code 256 is located in a functional form on computer readable media 258 that is selectively removable and may be loaded onto or transferred to data processing system 200 for running by processor unit 204. Program code 256 and computer readable media 258 form computer program product 260. In one example, computer readable media 258 may be computer readable storage media 262 or computer readable signal media 264. Computer readable storage media 262 may include, for example, an optical or magnetic disc that is inserted or placed into a drive or other device that is part of persistent storage 208 for transfer onto a storage device, such as a hard drive, that is part of persistent storage 208. Computer readable storage media 262 also may take the form of a persistent storage, such as a hard drive, a thumb drive, or a flash memory that is connected to data processing system 200. In some instances, computer readable storage media 262 may not be removable from data processing system 200.

Alternatively, program code 256 may be transferred to data processing system 200 using computer readable signal media 264. Computer readable signal media 264 may be, for example, a propagated data signal containing program code 256. For example, computer readable signal media 264 may be an electro-magnetic signal, an optical signal, and/or any other suitable type of signal. These signals may be transmitted over communication links, such as wireless communication links, an optical fiber cable, a coaxial cable, a wire, and/or any other suitable type of communications link. In other words, the communications link and/or the connection may be physical or wireless in the illustrative examples. The computer readable media also may take the form of non-tangible media, such as communication links or wireless transmissions containing the program code.

In some illustrative embodiments, program code 256 may be downloaded over a network to persistent storage 208 from another device or data processing system through computer readable signal media 264 for use within data processing system 200. For instance, program code stored in a computer readable storage media in a data processing system may be downloaded over a network from the data processing system to data processing system 200. The data processing system providing program code 256 may be a server computer, a client computer, or some other device capable of storing and transmitting program code 256.

The different components illustrated for data processing system 200 are not meant to provide architectural limitations to the manner in which different embodiments may be implemented. The different illustrative embodiments may be implemented in a data processing system including components in addition to, or in place of, those illustrated for data processing system 200. Other components shown in FIG. 2 can be varied from the illustrative examples shown. The different embodiments may be implemented using any hardware device or system capable of executing program code. As one example, data processing system 200 may include organic components integrated with inorganic components and/or may be comprised entirely of organic components excluding a human being. For example, a storage device may be comprised of an organic semiconductor.

As another example, a computer readable storage device in data processing system 200 is any hardware apparatus that may store data. Memory 206, persistent storage 208, and computer readable storage media 262 are examples of physical storage devices in a tangible form.

In another example, a bus system may be used to implement communications fabric 202 and may be comprised of one or more buses, such as a system bus or an input/output bus. Of course, the bus system may be implemented using any suitable type of architecture that provides for a transfer of data between different components or devices attached to the bus system. Additionally, a communications unit may include one or more devices used to transmit and receive data, such as a modem or a network adapter. Further, a memory may be, for example, memory 206 or a cache such as found in an interface and memory controller hub that may be present in communications fabric 202.

Data centers host infrastructure for applications that support and enable business of an enterprise. However, it should be noted that approximately half of the data centers has suffered at least five failures due to natural disasters from 2005 to 2015 according to a report. Post disaster, personnel may not be able to enter a data center due to extensive physical damage, or the data center may not be safe for personnel to enter due to one or more hazards (e.g., fire, flooding, exposed electrical cables, and the like), or personnel may not be aware of current conditions within the data center. In such cases, it is difficult to analyze the impact of the disaster on the data center and the assets contained therein.

Without proper impact assessment, creating a plan to recover assets of the data center would be difficult. In addition, time and impact assessment resources may also be limited post disaster. As a result, intelligent planning is required for early and efficient rescue and recovery of the assets in the data center post disaster.

Illustrative embodiments provide impact assessment in a data center post disaster and generate an optimal recovery plan according to financial value and operational viability of the assets within the data center. In other words, illustrative embodiments perform post disaster impact assessment in a data center using various modes of access into the data center and determine a plan to quickly and efficiently recover critical, financially valuable, and operationally viable assets by identifying the level of impact on each of the assets in the data center.

Illustrative embodiments divide the data center into different hazard segments based on a combination of hazard type, hazard level, and hazard physical location within the data center with respect to entry points and exit points of the data center (e.g., distance from entry points or exit points). Illustrative embodiments also calculate a total cost of recovering each asset from the data center as a function of time cost and impact assessment device operational cost. In addition, illustrative embodiments calculate a financial value for each recoverable asset as a function of asset operational viability and asset soft value (e.g., physical asset value, value of intellectual property stored on the asset, and the like). Further, illustrative embodiments assign a number of impact assessment devices of different types to each hazard segment of the data center, at different time periods, such that the most financially valuable and operationally viable assets post disaster are recovered at the earliest possible time given constraints on impact assessment device operational cost (e.g., number of vehicles available, capability of each vehicle (fly, move on the ground, move through water, and the like), recovery time, financial value of each recoverable asset, and physical location of each recoverable asset within a hazard segment (e.g., on the floor, on a shelf, in a cabinet, or the like).

Dividing the data center into different hazard segments depends on the type of hazard, based on time series feeds from Internet of Things (IoT) sensors already located within the data center, and the type of impact the disaster had on each hazard segment of the data center. Illustrative embodiments overlay the different hazard segments on a digital floorplan or map of the data center. Whenever data from the IoT sensors located within the data center are not available, illustrative embodiments utilize data from impact assessment devices, such as flying drones, soft robots, semi-autonomous vehicles, and the like, equipped with IoT sensors to detect environmental conditions and lights and cameras to take pictures and videos, to identify the different hazard segments within the data center. These impact assessment devices with IoT sensors and other embedded tools are capable of scanning the data center and overlaying the different hazard segments on the data center floorplan or maps. Illustrative embodiments assign a different disaster impact identifier tag to each different hazard segment within the data center.

After scanning the data center using the various impact assessment devices, such as flying drones, soft robots, semi-autonomous vehicles, and the like, illustrative embodiments generate an impact assessment database. The impact assessment database lists identified assets within the data center, current location versus expected location of each identified asset, financial value of each identified asset, operational viability score corresponding to each identified asset, safe path to reach each identified asset, type of impact assessment device that can reach an asset's location to recover that asset, estimated time to rescue each identified asset, estimated size and weight of each identified asset, and a list of scanned objects within the data center that could not be identified based on mapping the scanned objects to information in a corporate knowledgebase.

Furthermore, illustrative embodiments generate a disaster assessed map by overlaying all the data received from the IoT sensors and impact assessment devices on the data center floorplan or map to show a visual representation of the impact of the disaster on the data center. Illustrative embodiments enable a user to zoom in or zoom out on the disaster assessed map to show different levels of detail. Based on the information in the impact assessment database and the disaster assessed map, illustrative embodiments identify a set of critical assets within the data center that can be rescued and recovered within defined enterprise constraints, such as, for example, total recovery time, total recovery cost, and total recovered asset financial value.

Illustrative embodiments identify the different hazard-based segments within the data center using a digital floorplan of the data center showing all entry and exit paths in to and out of the data center. Appropriate IoT sensors are available, at appropriate locations, within the data center to identify hazards, such as, for example, fire, smoke, temperature, short circuits, water, water level, wind level, and the like. Illustrative embodiments receive time series recordings of these hazards from the IoT sensors as inputs. The IoT sensors may capture these time series recordings at, for example, five second intervals, ten second intervals, or some other time interval depending upon the illustrative embodiment. Moreover, illustrative embodiments receive time-based pictures and videos from cameras at various locations covering a 360-degree view within the data center. Illustrative embodiments utilize an object extraction and image analysis component to identify, for example, blocked pathways within the data center, damaged walls or support columns, fallen server racks, hazard locations, and the like.

Based on the received information above, illustrative embodiments assign a different hazard segment tag, such as, for example, a heat segment tag, a fire segment tag, a water segment tag, a physically damaged segment (e.g., collapsed wall) tag, an accident-prone segment (e.g., exposed, live electrical wire causing sparks) tag, or a combination of tags, to each hazard segment. For example, some hazard segments may be affected by water, some may be affected by short circuits or high levels of heat, some may be affected by broken flooring, some may be affected by hanging electrical cables, and the like. Then, illustrative embodiments generate a time-based hazard segment map with location boundaries within the data center. Illustrative embodiments generate this time-based hazard segment map by combining information, such as data liveliness of IoT sensors, locations of IoT sensors, feeds from the IoT sensors both positive and negative, digital data center floorplan, output from the object extraction and image analysis component, locations of cameras, areas covered by the cameras as per the digital floorplan, and the like.

The live IoT sensor data may be available to a remote server in a cloud environment or may be available to a local server, if still operationally viable, in the same data center. However, if live data from the IoT sensors and camera feeds within the data center are not available, then illustrative embodiments utilize mode of access (i.e., impact assessment devices) to obtain data and generate the hazard segments. Alternatively, illustrative embodiments may utilize data from both the IoT sensors and the impact assessment devices to generate the different hazard segments on the floorplan of the data center and enable access to the assets.

Illustrative embodiments select mode of access to the data center depending on the hazard segment type. Illustrative embodiments select the appropriate impact assessment devices, having the correct data collection sensors that match the conditions and circumstances corresponding to the disaster, from available inventory of impact assessment devices. If illustrative embodiments are not capable of generating the hazard segments within the data center floorplan when data from IoT sensors within the data center are not available, then illustrative embodiments deploy different impact assessment devices, either one by one or simultaneously, into the data center to collect data in order to generate a hazard segment map overlaid on the data center floorplan.

For example, for a heat and fire hazard segment in the data center, illustrative embodiments may deploy temperature sensitive soft robots and/or flying drones depending on location of the fire (e.g., fire on floor, rooftop, top of server rack, or the like). For a water hazard segment in the data center, illustrative embodiments may deploy flying drones and/or submersible watercraft. For a physically damaged hazard segment or accident-prone hazard segment, illustrative embodiments may deploy soft robots and/or robotic vehicles. If an impact assessment device senses conditions that the impact assessment device cannot tolerate on its current path within the data center, then illustrative embodiments will direct the impact assessment device to change direction of movement. If all paths become blocked and the impact assessment device cannot overcome the blocked pathways or the impact assessment device cannot tolerate the environmental conditions, such as rising water level, increasing heat level, and the like, within the data center, then illustrative embodiments will direct the impact assessment device to return to its original location or direct the impact assessment device to an alternate pathway to exit the data center or to a safe location. Illustrative embodiments analyze all information, such as, for example, location data, camera images, sensor data, and the like, received from the impact assessment devices to overlay the different hazard segments on the floorplan or map of the data center depending on the hazard type, hazard level, and hazard location with respect to entry and exit points of the data center. Entry and exit points located near the different hazard segments are used by these impact assessment devices to enter each hazard segment in the data center for impact assessment post disaster.

It should be noted that the impact assessment devices, such as soft robots and drones (e.g., air, land, and water drones), are equipped with light sources and 360-degree rotating cameras to take pictures and videos. Also, these impact assessment devices are also equipped with IoT sensors to detect, for example, temperature, water, smoke, and other environmental conditions. Illustrative embodiments receive timestamped values corresponding to the sensor data and images from the impact assessment devices via wireless communication links. It should be noted that illustrative embodiments and/or personnel in a command center may control the impact assessment devices within the data center. Also, illustrative embodiments may be deployed in a cloud environment as a service and accessed from anywhere in the world.

Illustrative embodiments identify valuable and operationally viable assets using, for example, data received from a computer vision component within the impact assessment devices. Illustrative embodiments detect all assets within the data center on both sides of the impact assessment device's pathway in specific hazard segments to perform impact assessment. Some of the detected assets may be identifiable, whereas some of the detected assets may not be identifiable due to impact of the disaster. Illustrative embodiments may utilize the floorplan of the data center and a corporate knowledgebase, along with the computer vision data, to identify assets.

For each identified asset, illustrative embodiments calculate a financial value for each respective asset. Asset financial value to an enterprise may depend on, for example, criticality of the asset as determined by information in the corporate knowledgebase. Illustrative embodiments save this asset financial value data in the impact assessment database.

Illustrative embodiments may identify assets using, for example, images of barcodes or serial numbers on assets and mapping the barcodes and serial numbers to information stored in the corporate knowledgebase. In addition, illustrative embodiments may utilize data from assets that emit signals using, for example, Bluetooth technology, RFID technology, network signals, or the like.

If a detected asset is identifiable and is a technical asset, such as, for example, a server or a laptop, then illustrative embodiments calculate a financial value for the asset based on intellectual property value of the asset, such as, for example, the financial value to the enterprise of data and code contained in the asset, the financial value to clients whose data were stored in the asset, and the like. If a detected asset is identifiable, but is not a technical asset, then illustrative embodiments may assign a catalog financial value to the asset based on, for example, a dynamic Web search. If a detected asset is not identifiable, then illustrative embodiments may assign a constant, baseline, or default financial value to the asset.

Further, illustrative embodiments also determine the operational viability status of each identified asset by analyzing the asset's current condition (e.g., is the asset under water, is the asset exposed to extreme heat or fire, does the color of the asset indicate burn marks or scorching, is the asset in its expected location, are foreign objects laying on the asset causing physical damage, and the like) by comparing stored images of the assets with current images of the assets. The impact assessment devices, such as soft robots and drones, have cameras to take pictures and videos and sensors to detect environmental conditions, such as temperature, water, smoke, and the like. Command center personnel may also assist with determining asset operational viability. For example, a person at the command center can confirm whether a particular mark on an asset is a burn mark or not. This may assist illustrative embodiments to calculate an operational viability score for assets. Illustrative embodiments also calculate the operational viability score for an asset as a function of the asset's physical attributes, system LED status, received sensor input values, and the like.

At the end of this process, illustrative embodiment have an impact assessment database that lists identified assets, current location versus expected location of each identified asset, financial value of each identified asset, operational viability score of each identified asset, safe path to reach each identified asset, and type of impact assessment device capable of reaching the location of each identified asset to recover that asset with or without human intervention. Also, the impact assessment database lists the condition of the path to each identified asset, identifier of the hazard segment in which each identified asset is located, estimated size and weight of each identified asset (e.g., based on an asset model number Web search or database lookup), and unidentifiable assets.

Illustrative embodiments generate an optimized plan for asset recovery based on a pictorial representation of the data center post disaster impact assessment. Illustrative embodiments overlay data, such as, for example, the different hazard segments, blocked pathways, asset locations, asset financial values, asset operational viability scores, and the like, on the floorplan of the data center to form the graphical representation (i.e., disaster assessed map) showing the current status of the data center for the purpose of physically rescuing and recovering assets. Illustrative embodiments may utilize different color codes and shades to differentiate the different assets within the data center floorplan based on a corresponding financial value and/or operational viability score of each asset. This pictorial representation can be zoomed in and zoomed out to get the detailed status of an asset and steps to reach the asset for recovery.

It should be noted that identifying valuable and operationally viable assets for a large data center and generating the disaster assessed map representing the current status of the data center post disaster may take considerable amount of time depending on the number of assets, types of hazards, size of the data center, availability of impact assessment devices, and the like. As a result, in order to optimize the recovery plan, illustrative embodiments categorize or prioritize the assets. For example, illustrative embodiments may prioritize for recovery a top 10% of critical and operationally viable assets first. Then, illustrative embodiments may prioritize a next 25% of operationally viable assets for recovery. Finally, illustrative embodiments may schedule remaining assets for recovery or may schedule remaining assets for recovery based on manual inputs from a user. Illustrative embodiments base critical categorization of assets on financial value of each asset and criticality of that asset in terms of enabling and supporting business of the enterprise according to information in the corporate knowledgebase.

Once illustrative embodiments identify criticality of assets, illustrative embodiments combine the assets with a combination of factors, such as, for example, an asset's operational viability score, recoverability of the asset in terms of available pathways to the asset, blockages in the pathways, availability of impact assessment devices (drones, robots, semi-autonomous vehicles, and the like) to assess impact, size and weight of the asset, and the like, to determine the top 10% critical and viable asset set for quick recovery. Illustrative embodiments may repeat the same process for other less critical asset categories. Illustrative embodiments update the disaster assessed map to reflect the latest impact assessment status. Also, illustrative embodiments may store different maps reflecting the impact assessed status according to the different asset categories.

Illustrative embodiments assign a set of impact assessment devices to each set of assets of a plurality of sets of assets such that each set of assets can be recovered with a same type of impact assessment device (e.g., all assets in the same set can be recovered by flying drones) to maximize a total financial value of the set of assets (i.e., maximize the sum of the financial values of the set of assets) and minimize a total rescue time for each set of assets. Illustrative embodiments repeat the assigning process for each different of the impact assessment device. Furthermore, illustrative embodiments run different simulations of asset rescue in terms of total time taken, total value recovered, and average recovery time by trying different combinations of assigning different types of impact assessment devices to different hazard segments at different times, up to a defined maximum number of times, or until at least a minimum threshold score is achieved. Illustrative embodiments utilize a highest scoring simulation as an impact assessment device plan with start and end times for asset rescue, expected financial value of the asset rescue, and total calculated impact assessment device cost. Illustrative embodiments record a tuple in the impact assessment database containing <hazard segment location identifier, impact assessment device type for asset rescue, estimated start and end times for the asset rescue, expected financial value of the asset rescue, calculated impact assessment device cost>. Illustrative embodiments dynamically determine which records to select and which ones to reject by computing a function score for each record based on expected <financial value of the asset rescue>, <number of available impact assessment device types>, and <impact assessment device cost> corresponding to each record. Illustrative embodiments maximize the function score by assigning different impact assessment devices to different hazard segment locations as long as an assignment is a feasible (i.e., the assigned impact assessment device can actually reach that particular hazard segment location).

As an example scenario, John Doe is a senior data center manager for an enterprise client and the enterprise's data center site is damaged by a natural disaster. The data center hosts highly critical applications to low priority applications for the enterprise client. The enterprise client had an emergency meeting at the top leadership level and called John in to the meeting. John told the leadership team that the situation seems to be bad (e.g., critical applications are down) and that it may not be safe for anyone to enter data center. John also stated that they do have a contract with the data center impact assessment service of illustrative embodiments.

The enterprise client wants its data center assessed for asset impact post disaster and have its critical assets (i.e., financially valuable and operationally viable critical assets) moved to another data center and make that data center operational as soon as possible. The data center impact assessment service starts assessing the data center using IoT sensors located in the data center and available impact assessment devices, such as flying drones, soft robots, semi-autonomous vehicles, and the like. The data center impact assessment service generates a pictorial representation of a disaster assessed map of the data center and provides a ranked list of the top 10% critical assets based on asset details, locations, financial values, operational viability scores, asset rescue costs, estimated time for asset rescue, hazard segments where the assets are located, type of impact assessment devices used for asset recovery, and the like. John presents the pictorial representation of the disaster assessed map to the leadership team. This helps the leadership team to plan further activities, such as approving budgets required for asset recovery, contracting for more impact assessment and recovery devices to speed up the actual recovery activities, developing disaster recovery plans from cloud or other locations, updating enterprise customers regarding impact of the disaster and providing an estimated time to restore normalcy, calculating estimated data loss, and the like.

Thus, illustrative embodiments provide one or more technical solutions that overcome a technical problem with recovering, at an earliest possible time, critical, financially valuable, and operationally viable assets from a data center post natural disaster given enterprise-defined constraints on cost, time, and asset value. As a result, these one or more technical solutions provide a technical effect and practical application in the field of data center post disaster management and physical asset rescue and recovery.

Figure 3A:
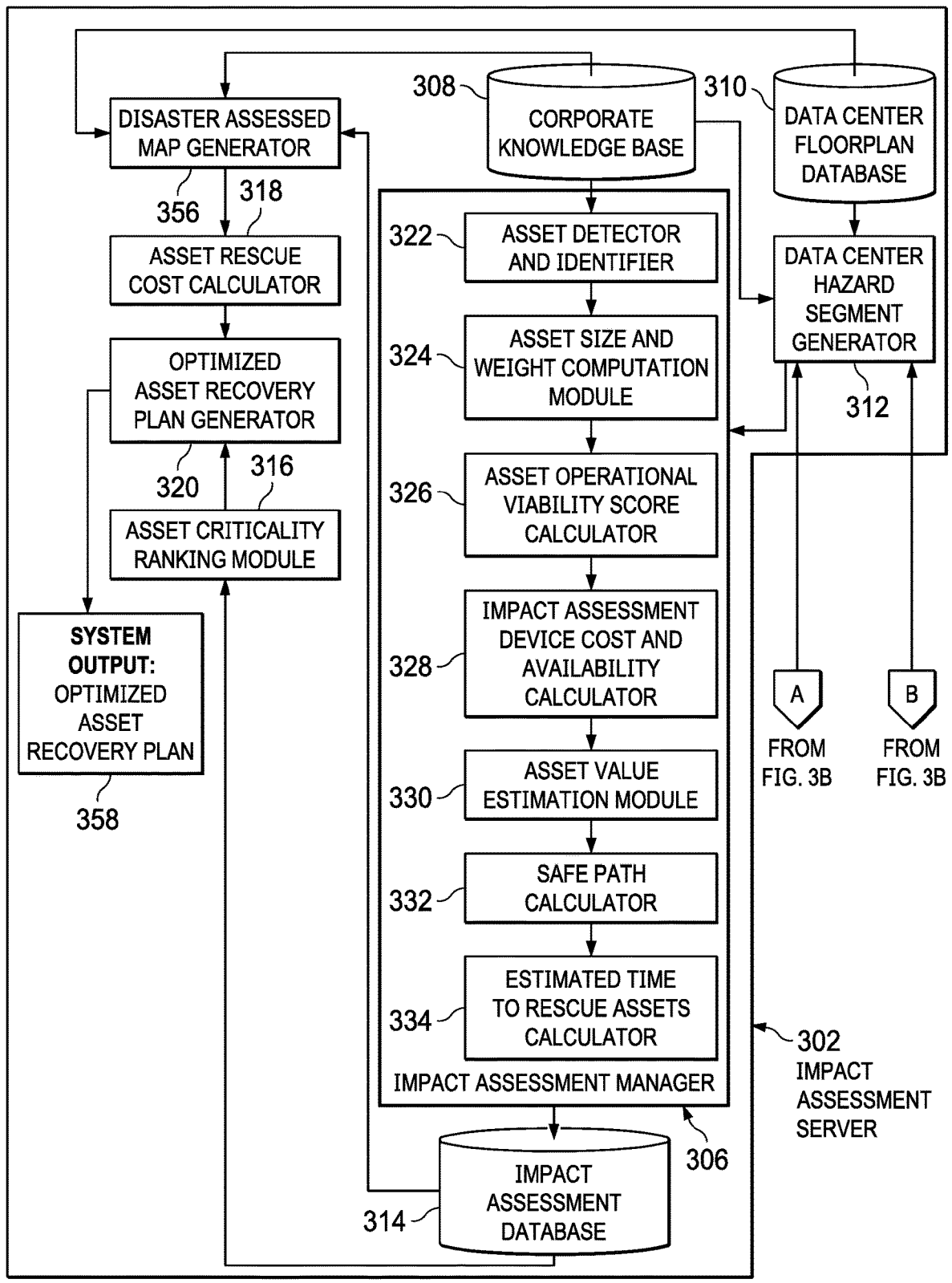
FIGS. 3A-3B are a diagram illustrating an example of an impact assessment system in accordance with an illustrative embodiment.
Figure 3B:
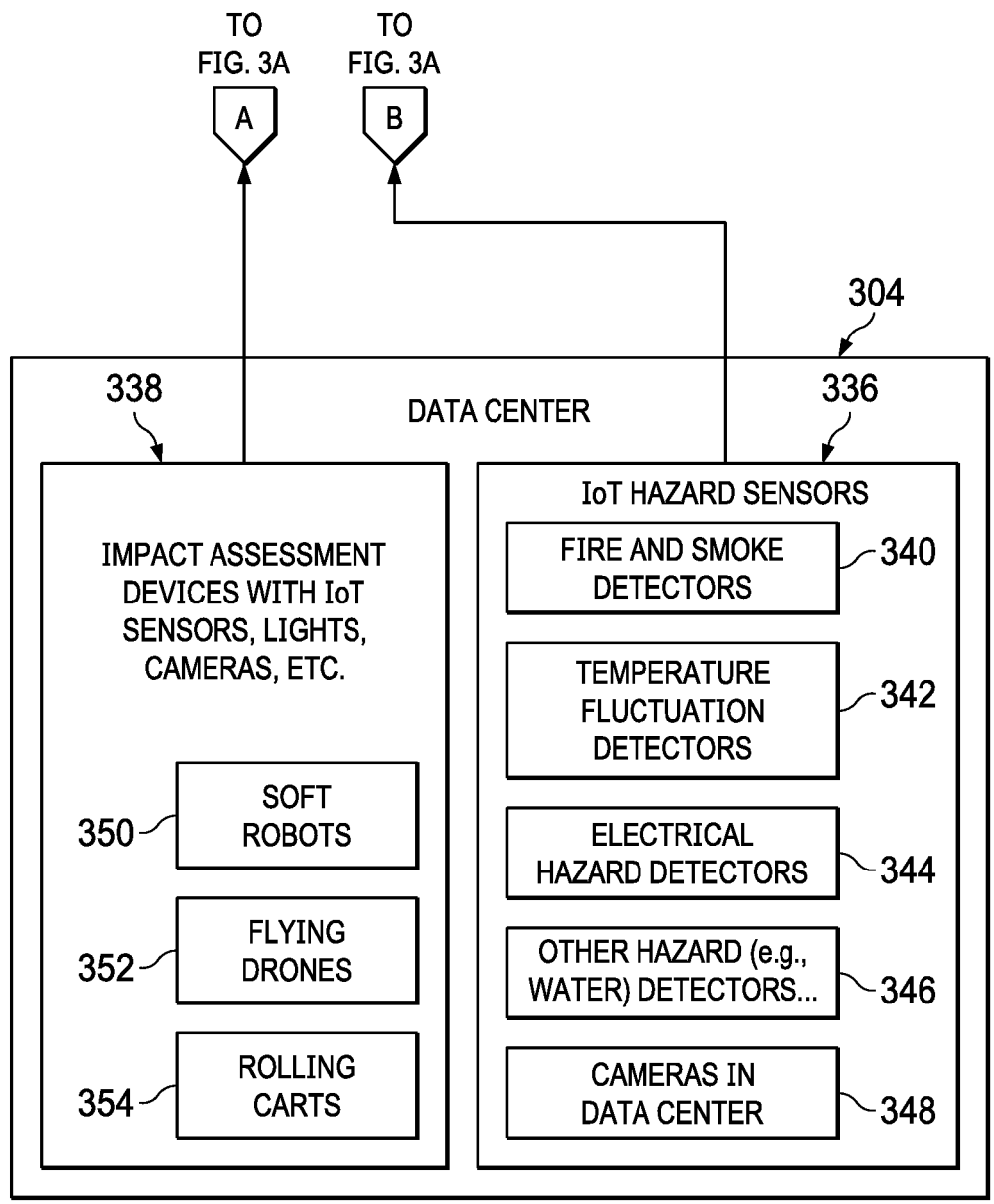

With reference now to FIGS. 3A-3B are, a diagram illustrating an example of an impact assessment system is depicted in accordance with an illustrative embodiment. Impact assessment system 300 may be implemented in a network of data processing systems, such as network data processing system 100 in FIG. 1. Impact assessment system 300 is a system of hardware and software components for assessing an impact of a disaster on a data center to physically rescue and recover critical, financially valuable, and operationally viable assets from the data center at an earliest possible time.

In this example, impact assessment system 300 includes impact assessment server 302 and data center 304. Impact assessment server 302 may be, for example, server 104 in FIG. 1 or data processing system 200 in FIG. 2. Data center 304 may be, for example, data center 110 in FIG. 1. However, it should be noted that impact assessment system 300 is intended as an example only and not as a limitation on illustrative embodiments. In other words, impact assessment system 300 may include any number of impact assessment servers servicing any number of data centers.

In this example, impact assessment server 302 includes impact assessment manager 306, corporate knowledgebase 308, data center floorplan database 310, data center hazard segment generator 312, impact assessment database 314, asset criticality ranking module 316, asset rescue cost calculator 318, and optimized asset recovery plan generator 320. Impact assessment manager 306 may be, for example, impact assessment manager 218 in FIG. 2. Impact assessment manager 306 includes asset detector and identifier 322, asset size and weight computation module 324, asset operational viability score calculator 326, impact assessment device cost and availability calculator 328, asset value estimation module 330, safe path calculator 332, and estimated time to rescue assets calculator 334.

Asset detector and identifier 322 detects and identifies assets in data center 304 post disaster using live time series data feeds from IoT hazard sensors 336 located in data center 304 and impact assessment devices 338 deployed in data center 304 by impact assessment manager 306. In this example, IoT hazard sensors 336 include fire and smoke detectors 340, temperature fluctuation detectors 342, electrical hazard detectors 344, other hazard detectors (e.g., water detectors) 346, and cameras 348. Impact assessment devices 338 include soft robots 350, flying drones 352, and rolling carts 354, each implemented with IoT sensors, lights, and cameras.

Asset size and weight computation module 324 estimates the size and weight of each identifiable asset based on the live time series data feeds from IoT hazard sensors 336 and impact assessment devices 338 and/or information contained in corporate knowledgebase 308 or other asset specification databases. Asset operational viability score calculator 326 calculates an operational viability score for each identifiable asset based on a determined operational viability status of each identifiable asset using the live time series data feeds from IoT hazard sensors 336 and impact assessment devices 338. Impact assessment device cost and availability calculator 328 estimates a total cost of operating impact assessment devices 338 during disaster impact assessment and asset rescue and retrieval.

Asset value estimation module 330 calculates a financial value of each identifiable asset based on several factors, such as, for example, operational viability score, estimated soft value, and determined criticality. Safe path calculator 332 identifies a safe path to each identifiable asset based on the live time series data feeds from IoT hazard sensors 336 and impact assessment devices 338 and the floorplan of data center 304 contained in data center floorplan database 310. Estimated time to rescue assets calculator 334 estimates the time required to rescue and recover each identifiable asset from data center 304.

Data center hazard segment generator 312 generates and overlays one or more hazard segments on the floorplan of data center 304 based on a combination of hazard type, hazard level, and hazard location with respect to entry and exit points of data center 304 using the live time series data feeds from IoT hazard sensors 336 and impact assessment devices 338. Impact assessment manager 306 places all of the information generated by asset detector and identifier 322, asset size and weight computation module 324, asset operational viability score calculator 326, impact assessment device cost and availability calculator 328, asset value estimation module 330, safe path calculator 332, estimated time to rescue assets calculator 334, and data center hazard segment generator 312 within impact assessment database 314 for further analysis.

Disaster assessed map generator 356 generates a disaster assessed map, which is a visual representation of the impact of the disaster on data center 304, by overlaying all of the information contained in impact assessment database 314 on the floorplan of data center 304 that is divided into hazard segments. Asset criticality ranking module 316 utilizes the information in impact assessment database 314 to rank each identifiable asset according to its criticality to the business of the enterprise, viability score, rescue cost, and rescue time, for example. Asset rescue cost calculator 318 estimates the total cost of rescuing and recovering each identifiable asset from data center 304.

Optimized asset recovery plan generator 320 outputs optimized asset recovery plan 358 based on information received from disaster assessed map generator 356, asset criticality ranking module 316, and asset rescue cost calculator 318. Optimized asset recovery plan 358 is a plan to physically rescue and recover critical, financially valuable, and operationally viable assets from data center 304 as soon as possible.

Figure 4:
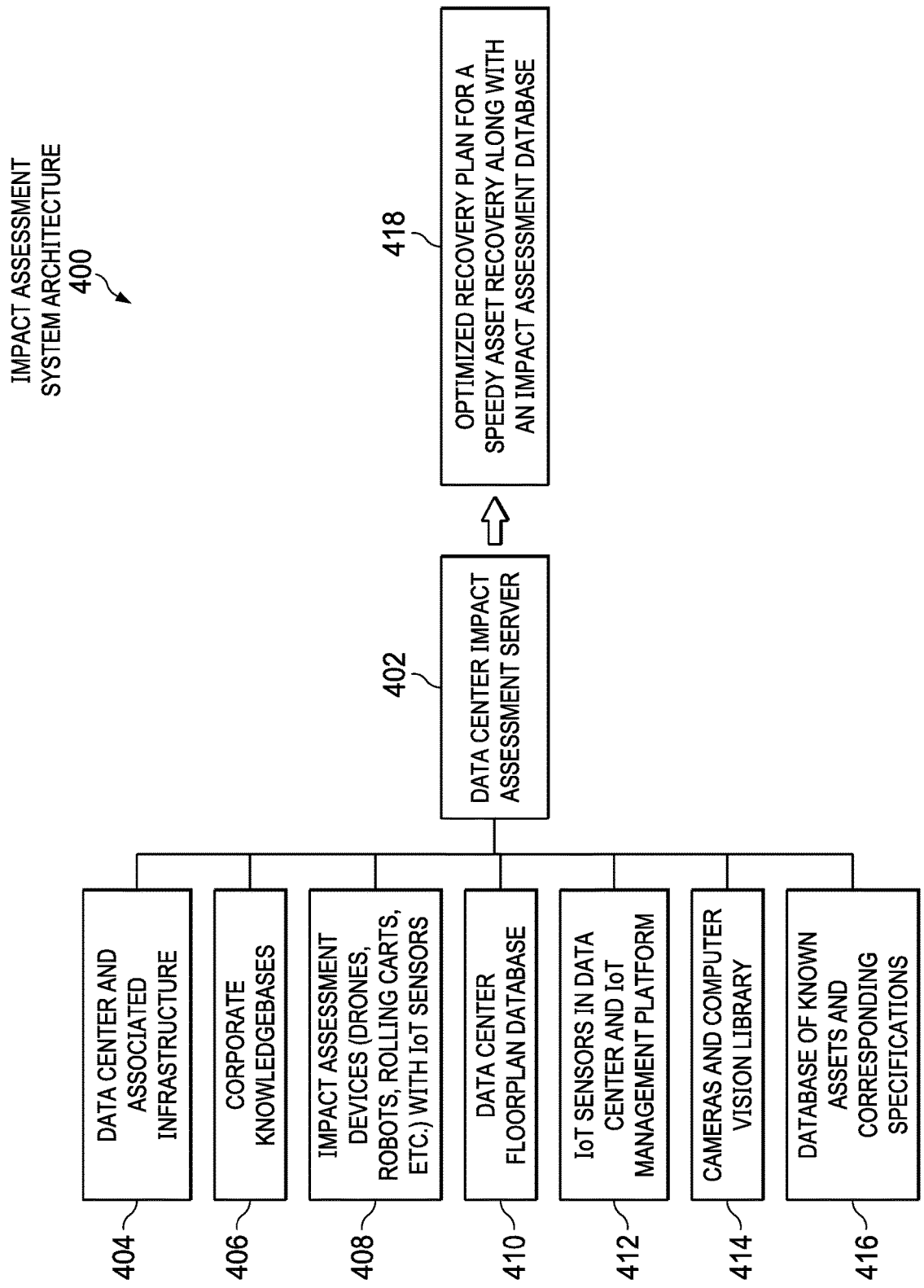
FIG. 4 is a diagram illustrating an example of an impact assessment system architecture in accordance with an illustrative embodiment.

With reference now to FIG. 4, a diagram illustrating an example of an impact assessment system architecture is depicted in accordance with an illustrative embodiment. Impact assessment system architecture 400 may be implemented in a network of data processing systems, such as network data processing system 100 in FIG. 1. Impact assessment system architecture 400 includes hardware and software components for assessing an impact of a disaster on a data center to physically rescue and recover critical, financially valuable, and operationally viable assets from the data center at an earliest possible time. In this example, impact assessment system architecture 400 comprises data center impact assessment server 402, data center and associated infrastructure 404, corporate knowledge bases 406, impact assessment devices with IoT sensors 408, data center floorplan database 410, IoT sensors in data center and IoT management platform 412, cameras and computer vision library 414, and database of known assets and corresponding specifications, such as corresponding asset sizes and weights, 416.

Figure 5A:
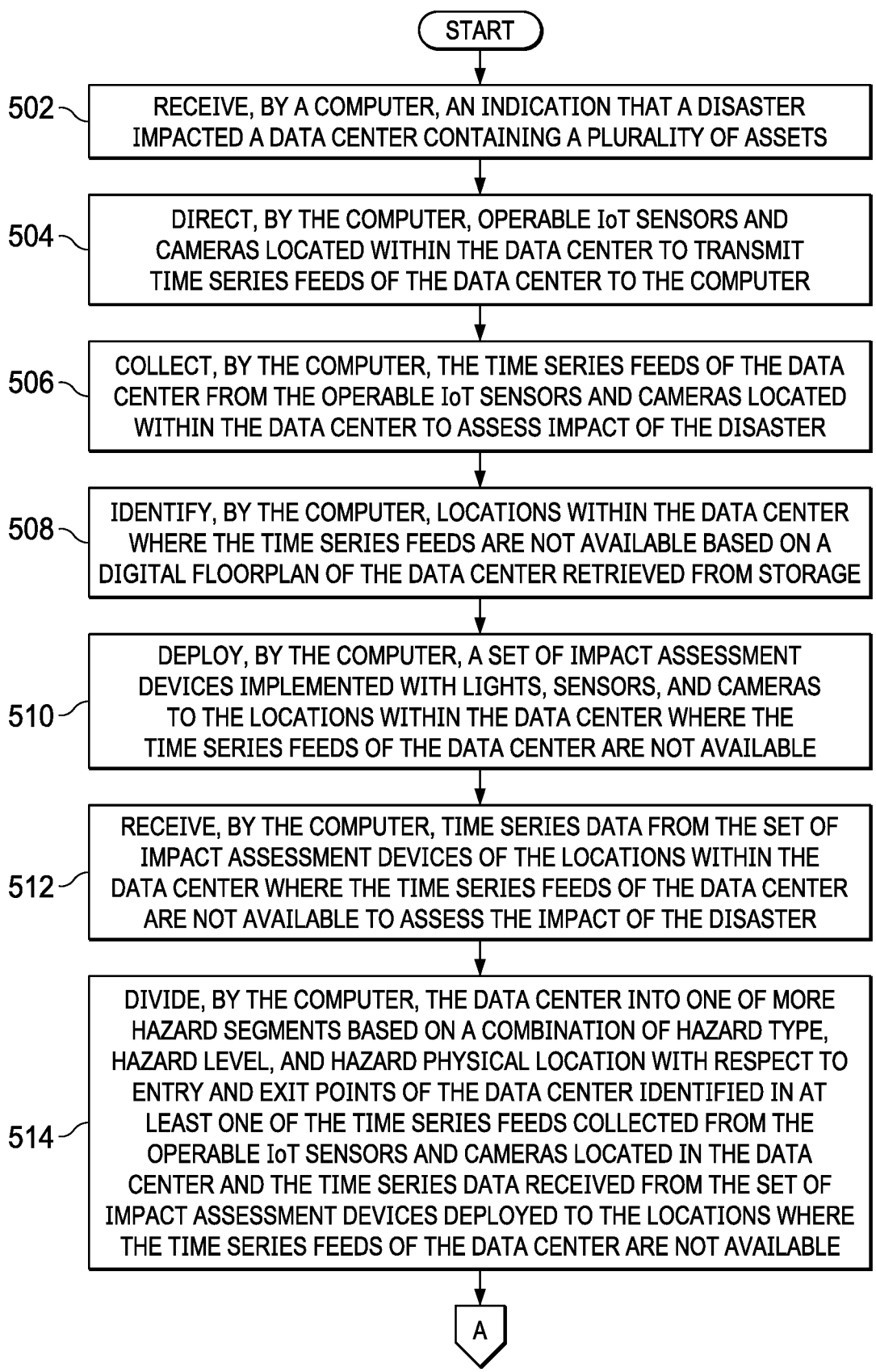
Figure 5B:
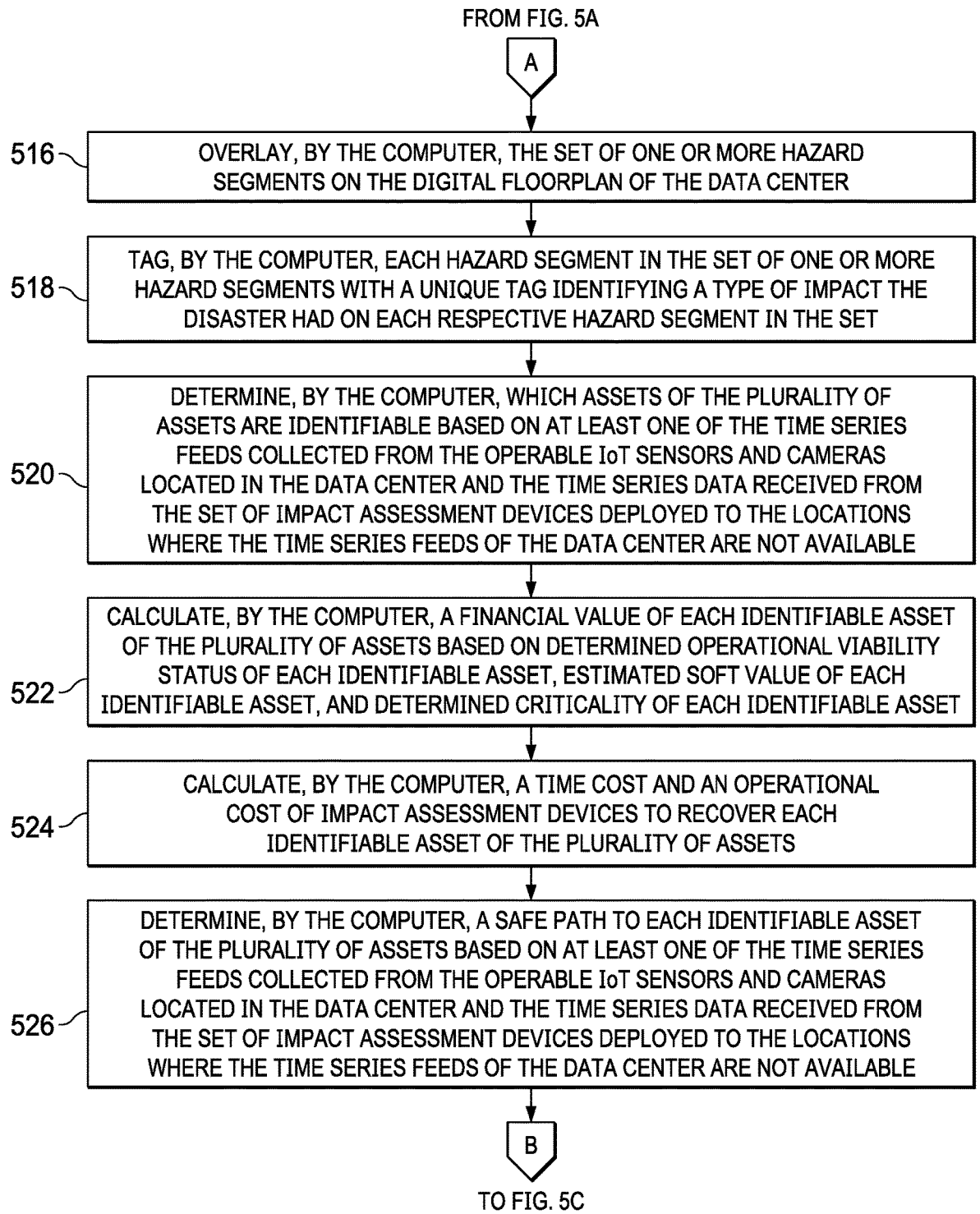

With reference now to FIGS. 5A-5C, a flowchart illustrating a process for assessing data center impact post disaster is shown in accordance with an illustrative embodiment. The process shown in FIGS. 5A-5C may be implemented in a computer, such as, for example, server 104 in FIG. 1, data processing system 200 in FIG. 2, impact assessment server 302 in FIG. 3A, or data center impact assessment server 402 in FIG. 4.

The process begins when the computer receives an indication that a disaster impacted a data center containing a plurality of assets (step 502). The indication may be, for example, an automated disaster signal or alarm generated by the data center, itself. Alternatively, the indication may be a user input received from a client device. The plurality of assets may include, for example, server computers, server racks, power distribution units, electrical cables, consoles, laptop computers, storage devices, and the like.

In response to receiving the indication in step 502, the computer directs operable IoT sensors and cameras located within the data center to transmit time series feeds of the data center to the computer (step 504). In addition, the computer collects and analyzes the time series feeds of the data center from the operable IoT sensors and cameras located within the data center to assess impact of the disaster (step 506). Further, the computer identifies locations within the data center where the time series feeds are not available based on a digital floorplan of the data center retrieved from storage (step 508).

The computer deploys a set of impact assessment devices implemented with lights, sensors, and cameras to the locations within the data center where the time series feeds of the data center are not available (step 510). The set of impact assessment devices may include, for example, one or more different types of drones, soft robots, autonomous vehicles, semi-autonomous vehicles, or any combination thereof. The computer receives time series data from the set of impact assessment devices of the locations within the data center where the time series feeds of the data center are not available to further assess the impact of the disaster (step 512).

The computer divides the data center into one or more hazard segments based on a combination of hazard type, hazard level, and hazard physical location with respect to entry and exist points of the data center identified in at least one of the time series feeds collected from the operable IoT sensors and cameras located in the data center and the time series data received from the set of impact assessment devices deployed to the locations where the time series feeds of the data center are not available (step 514). The hazard type is based on a type of impact (e.g., water) the disaster had on each hazard segment. The hazard level is a degree (e.g., amount of water) to which the disaster has impacted each hazard segment. The computer overlays the set of one or more hazard segments on the digital floorplan of the data center (step 516). The computer also tags each hazard segment in the set of one or more hazard segments with a unique tag identifying a type of impact the disaster had on each respective hazard segment in the set (step 518).

Furthermore, the computer determines which assets of the plurality of assets are identifiable based on at least one of the time series feeds collected from the operable IoT sensors and cameras located in the data center and the time series data received from the set of impact assessment devices deployed to the locations where the time series feeds of the data center are not available (step 520). The compute calculates a financial value of each identifiable asset of the plurality of assets based on determined operational viability status of each identifiable asset, estimated soft value of each identifiable asset, and determined criticality of each identifiable asset (step 522). The computer also calculates a time cost and an operational cost of impact assessment devices to recover each identifiable asset of the plurality of assets (step 524).

Moreover, the computer determines a safe path to each identifiable asset of the plurality of assets based on at least one of the time series feeds collected from the operable IoT sensors and cameras located in the data center and the time series data received from the set of impact assessment devices deployed to the locations where the time series feeds of the data center are not available (step 526). The computer generates an impact assessment database that contains a list of identifiable assets, current location of each identifiable asset, the financial value of each identifiable asset, the determined operational viability status of each identifiable asset, the determined safe path to each identifiable asset, type of impact assessment device able to reach the current location of each identifiable asset, estimated time of recovery of each identifiable asset, estimated cost of recovery of each identifiable asset, and estimated size and weight of each identifiable asset (step 528).

In addition, the computer generates a disaster assessed map that is a visual representation of the impact of the disaster on the data center by overlaying the information contained in the impact assessment database on the digital floorplan of the data center divided into the set of one or more hazard segments (step 530). Further, the computer generates an optimal asset recovery plan to rescue and recover identified critical, financially valuable, and operationally viable assets from the data center based on overlaid data of the disaster assessed map on the digital floorplan of the data center that is divided into the set of one or more hazard segments (step 532). The computer transmits the disaster assessed map and the optimal asset recovery plan to a client device for user review and possible modification (step 534).

The computer assigns one or more types of impact assessment devices to each hazard segment at different time periods to rescue and recover at an earliest possible time the identified critical, financially valuable, and operationally viable assets given enterprise-defined constraints on recovery cost, recovery time, and recovered asset value (step 536). The computer utilizes the one or more types of impact assessment devices assigned to each hazard segment at different time periods to physically rescue and recovery the identified critical, financially valuable, and operationally viable assets from the data center at the earliest possible time (step 538). Thereafter, the process terminates.

Thus, illustrative embodiments of the present invention provide a computer-implemented method, computer system, and computer program product for assessing an impact of a disaster on a data center to physically rescue and recover critical, financially valuable, and operationally viable assets from the data center at an earliest possible time. The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method for assessing data center impact post disaster, the computer-implemented method comprising:

dividing, by a computer, a data center into hazard segments post disaster based on a combination of hazard type, hazard level, and hazard location identified in time series information from Internet of Things (IoT) sensors and cameras, wherein the hazard type is based on a type of impact a disaster had on each hazard segment, the hazard level is a degree to which the disaster impacted each hazard segment, and the hazard location is with respect to entry and exit points of the data center;

assigning, by the computer, a financial value of each identifiable asset in the data center post disaster based on determined operational viability status of each identifiable asset, estimated soft value of each identifiable asset, and determined criticality of each identifiable asset;

calculating, by the computer, a time cost and an operational cost of impact assessment devices used to assess an impact on the data center post disaster and recover assets;

generating, by the computer, a disaster assessed map that is a visual representation of the impact of the disaster on the data center by overlaying the time series information, each assigned financial value, and the time cost and the operational cost of the impact assessment devices on a digital floorplan of the data center divided into the hazard segments;

assigning, by the computer, one or more types of impact assessment devices to each hazard segment at different time periods to rescue and recover financially valuable and operationally viable assets given constraints on cost, time, and asset value;

deploying, by the computer, the one or more types of impact assessment devices assigned to each hazard segment at the different time periods; and utilizing, by the computer, the one or more types of impact assessment devices assigned to each hazard segment at the different time periods to physically rescue and recover the financially valuable and operationally viable assets from the data center post disaster.

2. The computer-implemented method of claim 1 further comprising:

receiving, by the computer, an indication that the disaster impacted the data center containing a plurality of assets;

directing, by the computer, operable IoT sensors and cameras located within the data center to transmit time series feeds of the data center to the computer; and collecting and analyzing, by the computer, the time series feeds of the data center from the operable IoT sensors and cameras located within the data center to assess the impact of the disaster.

3. The computer-implemented method of claim 2 further comprising:

identifying, by the computer, locations within the data center where the time series feeds are not available based on the digital floorplan of the data center;

deploying, by the computer, a set of impact assessment devices implemented with lights, sensors, and cameras to the locations within the data center where the time series feeds of the data center are not available; and receiving, by the computer, time series data from the set of impact assessment devices of the locations within the data center where the time series feeds of the data center are not available to assess the impact of the disaster.

4. The computer-implemented method of claim 1 further comprising:

overlaying, by the computer, the hazard segments on the digital floorplan of the data center; and tagging, by the computer, each hazard segment with a unique tag identifying the type of impact the disaster had on each hazard segment.

5. The computer-implemented method of claim 1 further comprising:

determining, by the computer, which of the assets are identifiable based on the time series information from the IoT sensors and cameras.

6. The computer-implemented method of claim 1 further comprising:

determining, by the computer, a safe path to each identifiable asset based on the time series information from the IoT sensors and cameras.

7. The computer-implemented method of claim 1 further comprising:

generating, by the computer, an impact assessment database that contains a list of identifiable assets, current location of each identifiable asset, calculated financial value of each identifiable asset, determined operational viability status of each identifiable asset, determined safe path to each identifiable asset, type of impact assessment device able to reach the current location of each identifiable asset, estimated time of recovery of each identifiable asset, estimated cost of recovery of each identifiable asset, and estimated size and weight of each identifiable asset.

8. The computer-implemented method of claim 1 further comprising:

generating, by the computer, an optimal asset recovery plan to rescue and recover the financially valuable and operationally viable assets from the data center based on overlaid data of the disaster assessed map on the digital floorplan of the data center that is divided into the hazard segments; and transmitting, by the computer, the disaster assessed map and the optimal asset recovery plan to a client device.

9. The computer-implemented method of claim 1 further comprising:

assigning, by the computer, a set of impact assessment devices to each set of assets of a plurality of sets of assets such that each set of assets can be recovered with a same type of impact assessment device to maximize a total financial value and minimize a total rescue time for each set of assets;

repeating, by the computer, the assigning for each different type of impact assessment device;

running, by the computer, different simulations of asset rescue in terms of total time taken, total value recovered, and average recovery time by trying different combinations of assigning different types of impact assessment devices to different hazard segments at different times, up to a defined maximum number of times, or until at least a minimum threshold score is achieved;

utilizing, by the computer, a highest scoring simulation as an impact assessment device plan with start and end times for the asset rescue, expected financial value of the asset rescue, and total calculated impact assessment device cost;

recording, by the computer, a tuple in an impact assessment database containing a hazard segment location identifier, an impact assessment device type for the asset rescue, estimated start and end times for the asset rescue, expected financial value of the asset rescue, and calculated impact assessment device cost;

determining, by the computer, which records to select or to reject by computing a function score for each record based on expected financial value of the asset rescue, number of available impact assessment device types, and impact assessment device cost corresponding to each record;

maximizing, by the computer, the function score by assigning different impact assessment devices to different hazard segment locations as long as an assignment is feasible; and ranking, by the computer, the records by a respective function score of each record.

10. The computer-implemented method of claim 1, wherein the impact assessment devices are selected from a group consisting of drones, soft robots, and automated vehicles.

11. A computer system for assessing data center impact post disaster, the computer system comprising:

a bus system;

a storage device connected to the bus system, wherein the storage device stores program instructions; and a processor connected to the bus system, wherein the processor executes the program instructions to:

divide a data center into hazard segments post disaster based on a combination of hazard type, hazard level, and hazard location identified in time series information from Internet of Things (IoT) sensors and cameras, wherein the hazard type is based on a type of impact a disaster had on each hazard segment, the hazard level is a degree to which the disaster impacted each hazard segment, and the hazard location is with respect to entry and exit points of the data center;

assign a financial value of each identifiable asset in the data center post disaster based on determined operational viability status of each identifiable asset, estimated soft value of each identifiable asset, and determined criticality of each identifiable asset;

calculate a time cost and an operational cost of impact assessment devices used to assess an impact on the data center post disaster and recover assets;

generate a disaster assessed map that is a visual representation of the impact of the disaster on the data center by overlaying the time series information, each assigned financial value, and the time cost and the operational cost of the impact assessment devices on a digital floorplan of the data center divided into the hazard segments;

assign one or more types of impact assessment devices to each hazard segment at different time periods to rescue and recover financially valuable and operationally viable assets given constraints on cost, time, and asset values;

deploy the one or more types of impact assessment devices assigned to each hazard segment at the different time periods; and utilize the one or more types of impact assessment devices assigned to each hazard segment at the different time periods to physically rescue and recover the financially valuable and operationally viable assets from the data center post disaster.

12. The computer system of claim 11, wherein the processor further executes the program instructions to:

receive an indication that the disaster impacted the data center containing a plurality of assets;

direct operable IoT sensors and cameras located within the data center to transmit time series feeds of the data center to the computer system; and collect and analyze the time series feeds of the data center from the operable IoT sensors and cameras located within the data center to assess the impact of the disaster.

13. The computer system of claim 12, wherein the processor further executes the program instructions to:

identify locations within the data center where the time series feeds are not available based on the digital floorplan of the data center;

deploy a set of impact assessment devices implemented with lights, sensors, and cameras to the locations within the data center where the time series feeds of the data center are not available; and receive time series data from the set of impact assessment devices of the locations within the data center where the time series feeds of the data center are not available to assess the impact of the disaster.

14. A computer program product for assessing data center impact post disaster, the computer program product comprising a computer readable storage medium having program instructions embodied therewith, the program instructions executable by a computer to cause the computer to perform a method comprising:

dividing, by the computer, a data center into hazard segments post disaster based on a combination of hazard type, hazard level, and hazard location identified in time series information from Internet of Things (IoT) sensors and cameras, wherein the hazard type is based on a type of impact a disaster had on each hazard segment, the hazard level is a degree to which the disaster impacted each hazard segment, and the hazard location is with respect to entry and exit points of the data center;

assigning, by the computer, a financial value of each identifiable asset in the data center post disaster based on determined operational viability status of each identifiable asset, estimated soft value of each identifiable asset, and determined criticality of each identifiable asset;

calculating, by the computer, a time cost and an operational cost of impact assessment devices used to assess an impact on the data center post disaster and recover assets;

generating, by the computer, a disaster assessed map that is a visual representation of the impact of the disaster on the data center by overlaying the time series information, each assigned financial value, and the time cost and the operational cost of the impact assessment devices on a digital floorplan of the data center divided into the hazard segments;

assigning, by the computer, one or more types of impact assessment devices to each hazard segment at different time periods to rescue and recover financially valuable and operationally viable assets given constraints on cost, time, and asset value;

deploying, by the computer, the one or more types of impact assessment devices assigned to each hazard segment at the different time periods; and utilizing, by the computer, the one or more types of impact assessment devices assigned to each hazard segment at the different time periods to physically rescue and recover the financially valuable and operationally viable assets from the data center post disaster.

15. The computer program product of claim 14 further comprising:

receiving, by the computer, an indication that the disaster impacted the data center containing a plurality of assets;

directing, by the computer, operable IoT sensors and cameras located within the data center to transmit time series feeds of the data center to the computer; and collecting and analyzing, by the computer, the time series feeds of the data center from the operable IoT sensors and cameras located within the data center to assess the impact of the disaster.

16. The computer program product of claim 15 further comprising:

identifying, by the computer, locations within the data center where the time series feeds are not available based on the digital floorplan of the data center;

deploying, by the computer, a set of impact assessment devices implemented with lights, sensors, and cameras to the locations within the data center where the time series feeds of the data center are not available; and receiving, by the computer, time series data from the set of impact assessment devices of the locations within the data center where the time series feeds of the data center are not available to assess the impact of the disaster.

17. The computer program product of claim 14 further comprising:

overlaying, by the computer, the hazard segments on the digital floorplan of the data center; and tagging, by the computer, each hazard segment with a unique tag identifying the type of impact the disaster had on each hazard segment.

18. The computer program product of claim 14 further comprising:

determining, by the computer, which of the assets are identifiable based on the time series information from the IoT sensors and cameras.

* * * * *